Patented Sept. 24, 1929

1,729,574

UNITED STATES PATENT OFFICE

SAM E. FINLEY, OF ATLANTA, GEORGIA

APPARATUS FOR PREPARING ROAD-SURFACING COMPOSITIONS IN SITU

Application filed November 15, 1928. Serial No. 319,556.

This invention relates to an apparatus for preparing and manufacturing, in place on road surfaces, compositions or combinations of uniformly mixed aggregate or solid material and bituminous binder, of which each element of the aggregate is completely coated with the binder, thus producing a mixture or composition which is, in effect, bituminous concrete, which, upon being laid and properly compacted, will mature into wearing surfaces of the highest stability, smoothness, durability and waterproofness.

The invention is illustrated in the accompanying drawings, in which:—

Fig. 1 is a perspective view of said apparatus associated with a tank wagon or truck, such as is commonly employed for spraying binding media on roads.

Fig. 2 is a plan view showing the preferred arrangement of the excavating and mixing blades and associated spraying means.

Fig. 3 is a perspective view of the rear blade.

Fig. 4 is an end elevation of the forward blade and spray header illustrating the action of the blade in raising and tumbling the aggregate and the spraying of the latter with the binding medium.

In a companion application filed of even date herewith, I have described and claimed a method of preparing road surfacing compositions in situ and the present application is directed to the preferred form of apparatus employed in carrying out the method.

Referring to the drawings, 1 indicates a tank vehicle for containing the binding medium, usually in the form of either a bituminous cement containing a hydrocarbon cutback or liquefier, or a highly heated bitumen, to be distributed upon and admixed with the aggregate or solid material, the vehicle preferably being of the type illustrated in my prior Patent No. 1,397,045 dated November 15, 1921, from which the manifold or distributor bar has been removed and replaced by a special form of distributor or spray bar, to be hereinafter described, and which is connected to the tank by a pipe 2.

Secured to and forming a rearward extension of the chassis frame of the vehicle is a platform 3, from which is adjustably suspended a special arrangement of scrapers or blades, associated with the mechanism for spraying the binding medium onto the aggregate or solid material, while the latter is being operated upon by the scrapers in the manner and form hereinafter described.

Pivoted to the framework or platform 3 are two angular arms 10, 10, to the lower ends of which is rigidly secured a scraper or blade 11 having a detachable and renewable cutter element 12 fastened to its lower portion, the blade as a whole being curved downwardly and forwardly and being disposed transversely of the longitudinal axis of the vehicle and at an angle of approximately 30° to said axis. Each of the arms 10, 10 is connected to operating mechanism mounted on the top of the platform 3, so that these arms may be raised and lowered independently to properly adjust the cutting edge of the blade 11 with respect to the road surface over which the tank vehicle travels. This adjusting mechanism may be of any of the preferred forms commonly employed in adjusting the blades of road scrapers or drags and, as illustrated, each adjusting device comprises a pedestal 13 fastened to the top of the platform 3, in the upper part of which is mounted a stub shaft 15 carrying a worm 16 secured to a hand wheel 14, the worm engaging a worm wheel 17 journaled in the pedestal 13 and having secured to one of its faces a lever arm 18, the outer end of which is connected by a link 19 to the corresponding pivoted arm 10. It will be apparent that, by operating the hand wheels 14, the blade 11 may be raised and lowered to a uniform extent throughout its length, with respect to the road surface, or either end of the blade may be elevated relative to the other, in practically the same manner as a standard road scraper or drag.

To the rear of the blade 11, there is mounted a generally similar blade 11', which is swung below the platform 3 by arms 10', 10' pivoted to the frame of the platform, said blade 11' being disposed at an angle of substantially 30° to the longitudinal axis of the vehicle and at an angle of approximately 60° to the longitudinal axis of blade 11, the rela- Patented Sept. 24, 1929

1,729,575

UNITED STATES PATENT OFFICE